Oct. 23, 1956 P. A. ENGSTROM 2,767,699
INDUCTION SYSTEM FOR INTERNAL COMBUSTION ENGINE
Filed May 5, 1955 3 Sheets-Sheet 1

*INVENTOR.*
PAUL A. ENGSTROM
BY
Hauke & Hardesty,
ATTORNEYS

Oct. 23, 1956
P. A. ENGSTROM
2,767,699
INDUCTION SYSTEM FOR INTERNAL COMBUSTION ENGINE
Filed May 5, 1955
3 Sheets-Sheet 2
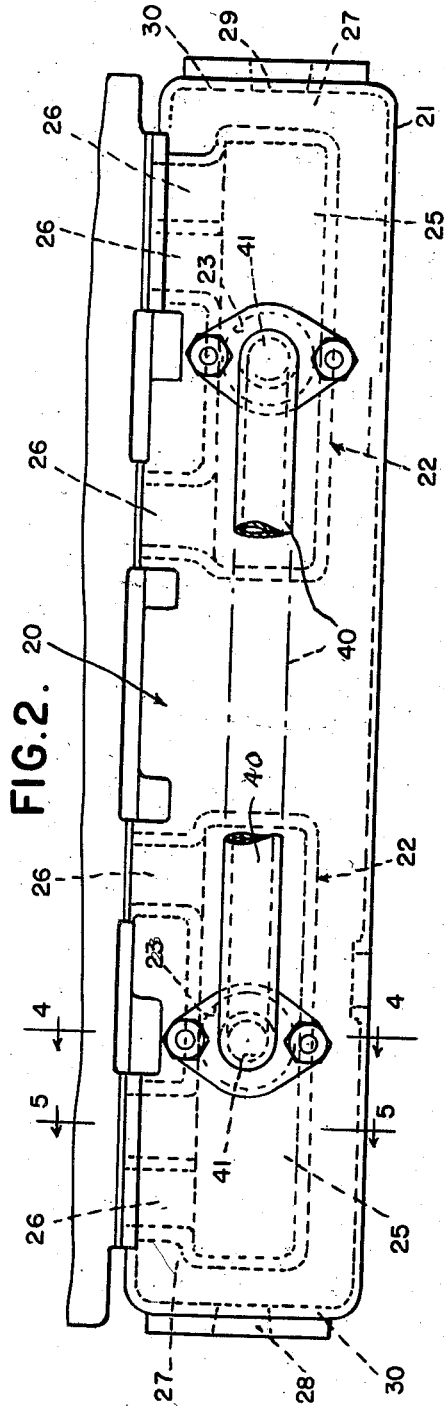
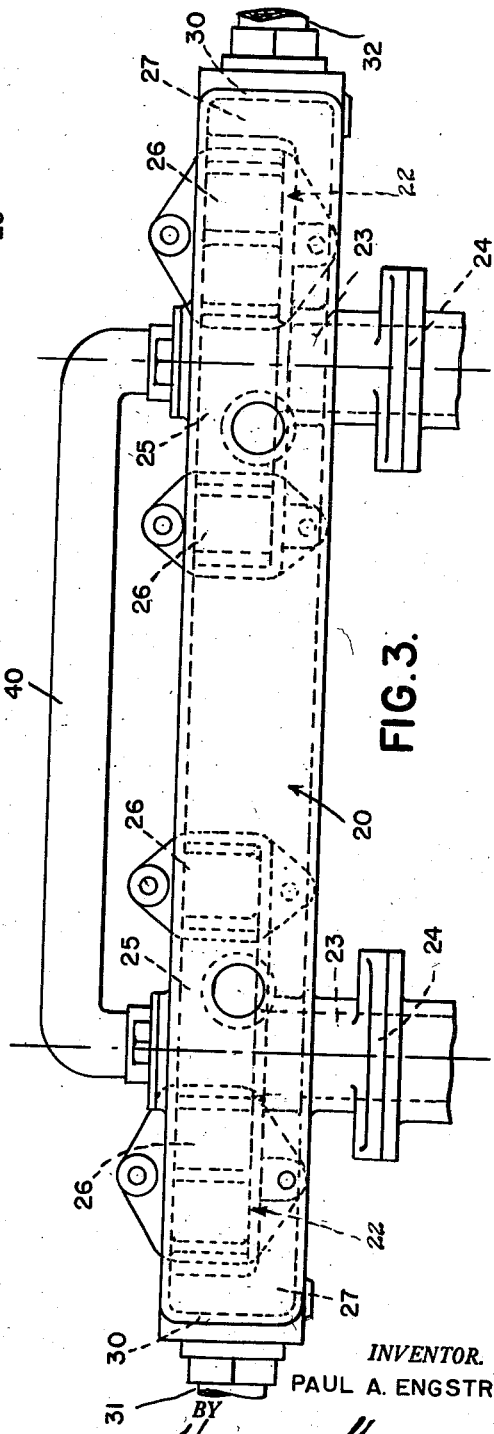
INVENTOR.
PAUL A. ENGSTROM
BY
Hauke & Hardesty
ATTORNEYS

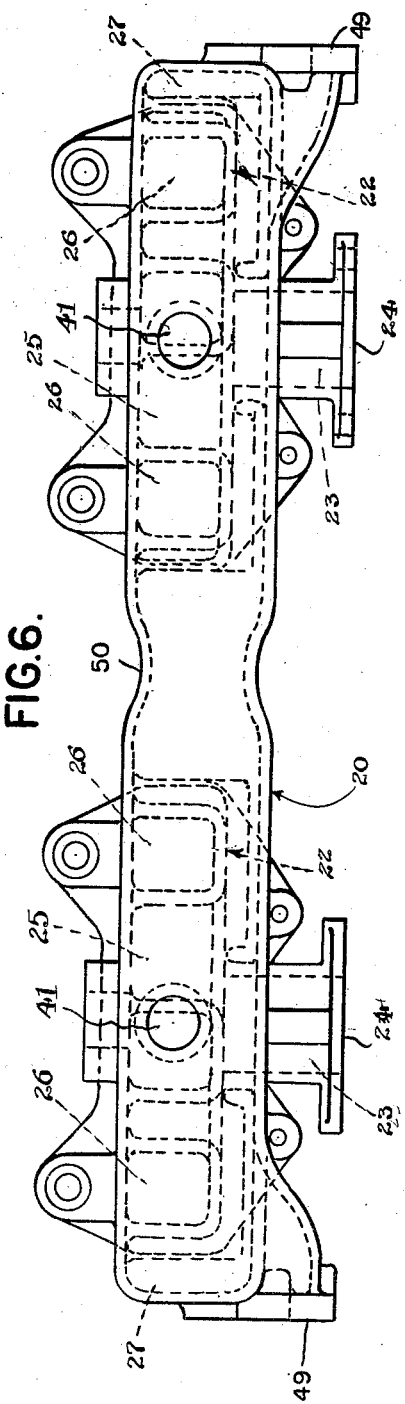
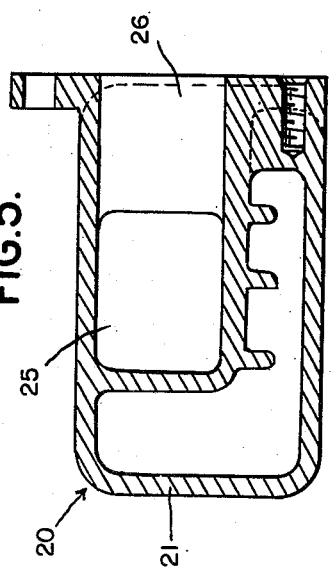

United States Patent Office 2,767,699
Patented Oct. 23, 1956

2,767,699
INDUCTION SYSTEM FOR INTERNAL COMBUSTION ENGINE

Paul A. Engstrom, Detroit, Mich., assignor to Gray Marine Motor Company, Detroit, Mich., a corporation of Michigan Application May 5, 1955, Serial No. 506,205
9 Claims. (Cl. 123—122)

This invention relates to an induction system for an internal combustion engine, and more particularly to a water jacketed intake manifold and to its construction.

In the marine engine field, due to the fact that in many installations the engine is located in the boat interior beneath the deck, great care must always be exercised in the disposal and use of the hot exhaust gases. In the automotive field it is customary to utilize the hot exhaust gases for heating the intake gases, whereas in the engines used in marine applications, it has been found that automotive practice is not satisfactory, nor is it safe. It has therefore been proposed to heat the intake manifold from the hot water and this is generally satisfactory and safe, but in many installations it has been found that engine efficiency will sometimes suffer when such jackets are improperly designed.

In heavy duty in-line engines using dual or separate carburetors, the manifold structures are not readily jacketed for water heating, and in applications using dual or separate carburetors and separate intake manifolds, engine efficiency may be enhanced by properly balancing same one with the other, and a feature of the present invention comprises a novel means for balancing a pair of separate intake manifold assemblies.

Therefore, the object of the present invention is to improve engine efficiency and safety in operation by providing a novel induction system which insures uniform and efficient intake manifold heating and improved balancing of the separate intake manifolds serving the engine.

For a more detailed understanding of the invention reference may be had to the accompanying drawings illustrating preferred embodiments thereof in which like parts are referred to by like reference characters throughout the several views and in which Fig. 1 is a side elevational view of an integral combustion engine equipped with an intake manifold embodying the principles of the present invention.

Fig. 2 is a plan view of the jacketed intake manifold structure.

Fig. 3 is a side view thereof.

Fig. 5 is a sectional view taken on the line 5—5 of Fig. 2 and

Fig. 6 is a side elevational view of an intake manifold structure of modified construction.

Figure 1:
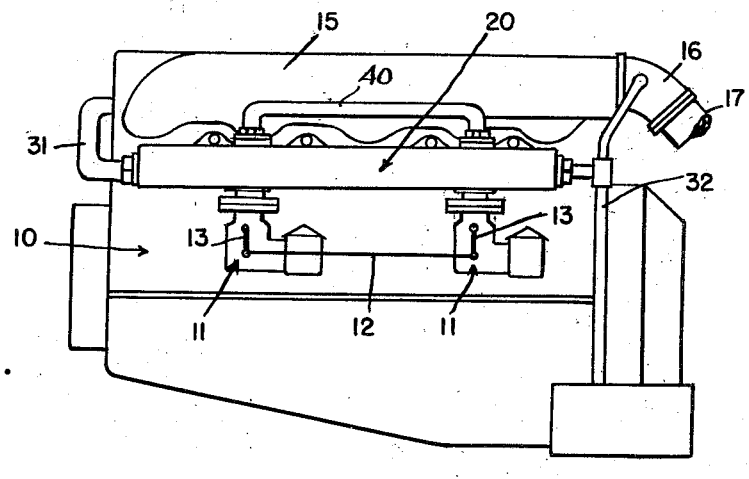
Figure 4:
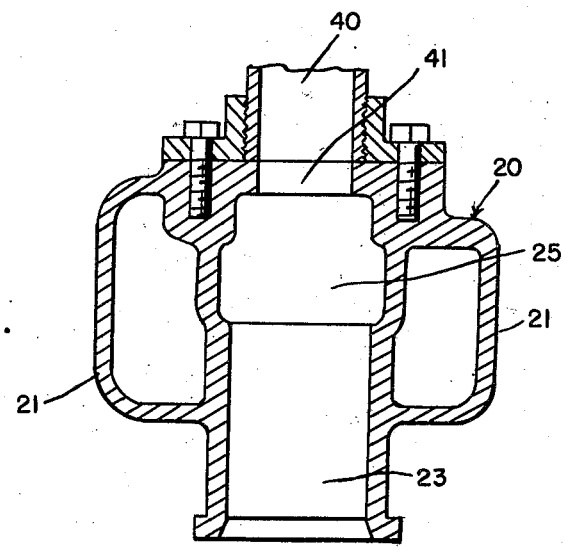
Fig. 4 is a transverse sectional view taken substantially on the line 4—4 of Fig. 2.

In the drawings, reference character 10 refers to an in-line multi-cylinder internal combustion engine of the type having two groups of equal number cylinders served by a separate and independent manifold section and preferably by separate carburetors 11. These carburetors are preferably joined together for simultaneous operation by means of a link 12 or other suitable connecting means joining their respective throttle valve levers 13.

The engine is supplied with the usual exhaust manifold 15, which exhausts the burned gases through the exhaust elbow 16 and to the exhaust pipe 17.

The fuel and air mixture induction system comprises an intake manifold structure 20 constructed of an integral casting having an outer elongated box-like wall 21 and a pair of separate and independent intake manifold sections 22 whose bottom and side walls are spaced from the wall 21 to provide passages or jackets through which heated water may be circulated in heat exchange relation with respect to the aforesaid intake manifold sections.

Each of the intake manifold sections 22 which are preferably integrally cast with the outer wall 21 are provided with a riser or primary conducting portion 23 communicating with intake openings or ports 24 connected with one of the carburetors 11. The primary conduction portion connects with longitudinal runners or passages 25 which are in turn connected with the lateral or port runners or passages 26 connected respectively with the engine cylinders. As herein illustrated the invention is shown in connection with a six-cylinder in-line engine and each manifold section serves three engine cylinders; one section serving engine cylinders 1, 2 and 3, and the other section serving cylinders 4, 5 and 6.

It will be observed that the outer wall 21 extends beyond the outer ends of the intake manifold sections 22 and provides a header portion 27 at each end of the intake manifold structure 20. Water inlet and outlet ports 28 and 29 respectively are carried in the end walls 30 of the intake manifold structure 20. A suitable connection 31 connects the port 28 with the outlet of the engine jacket and said outlet 29 connects with a water outlet pipe 32 leading to a suitable heat exchanger or water cooler.

The heated water from the engine is thus introduced at one end of the jacketed intake manifold structure and uniformly circulated in heat exchange relation with the walls of the intake manifold sections 22, providing adequate heat to warm the intake fuel mixture as it is distributed to the engine cylinders.

A balance tube 40 connects each of these intake manifold sections and preferably comprises a long tube extending longitudinally and overlying the intake manifold structure 20, the tube being downwardly bent at each end and connected with openings 41 in the top of the intake manifold structure directly opposite to the primary conducting portion or riser portion 23, and these openings 41 are preferably substantially axially aligned with said risers for best engine performance.

The walls 21 of the intake manifold structure are preferably straight and plane, and thus provide a jacket having unrestricted passages for conveying the heated water from one end of the structure to the other.

In Fig. 6 a slightly modified construction is illustrated and provides water intake and outlet portions located as at 49 off center with respect to the longitudinal axis of the manifold structure, while that construction of Figs. 2 and 3 show the water intake and outlet axially aligned with said longitudinal axis of the structure. Further, the casting intermediate of the intake manifold sections may be indented as at 50, to provide a restricted connection between jackets about the separate intake manifold sections. Usually very little or no restriction is desired, but due to varying requirements in engine design, it is sometimes preferred to have a reduced jacket construction to obtain certain desired velocity control of the circulated water.

It will be apparent to those skilled in the art to which this invention pertains that various changes and modifications may be made therein without departing from the spirit of the invention or from the scope of the appended claims.

I claim:

1. In an induction system for an in-line multi-cylinder internal combustion engine, an intake manifold structure having a pair of longitudinally spaced fuel and air mixture intakes, a carburetor connected with each of said intakes, said intake manifold structure comprising independent separate manifold sections each connected with half of said engine cylinders and each having a distributing portion and a primary conducting portion connecting said distributing portion with one of said intakes, and an outer wall enclosing both said manifold sections and providing a jacket through which heated water may be circulated and having water inlet and outlet ports disposed respectively at the extreme ends of said manifold structure whereby said heated water is circulated longitudinally through the jacket in heat exchange relation with both of said manifold sections.

2. In an induction system for an in-line multi-cylinder internal combustion engine, an intake manifold structure having a pair of longitudinally spaced fuel and air mixture intakes, a carburetor connected with each of said intakes, said intake manifold structure comprising independent separate manifold sections each connected with half of said engine cylinders and each having a distributing portion with one of said intakes, and an outer wall enclosing both said manifold sections and providing a jacket through which heated water may be circulated and having water inlet and outlet ports disposed respectively at the extreme ends of said manifold structure whereby said heated water is circulated longitudinally through the jacket in heat exchange relation with both of said manifold sections, said jacket comprising an open passageway enclosing the bottom walls and both sides of each of said manifold sections.

3. In an induction system for an in-line multi-cylinder internal combustion engine, an intake manifold structure having a pair of longitudinally spaced fuel and air mixture intakes, a carburetor connected with each of said intakes, said intake manifold structure comprising independent separate manifold sections each connected with half of said engine cylinders and each having a distributing portion with one of said intakes, and an outer wall enclosing both said manifold sections and providing a jacket through which heated water may be circulated and having water inlet and outlet ports disposed respectively at the extreme ends of said manifold structure whereby said heated water is circulated longitudinally through the jacket in heat exchange relation with both of said manifold sections, said jacket comprising an open passageway enclosing the bottom walls and both sides of each of said manifold sections, said jacket extending beyond the ends of said manifold sections to provide a header portion at each end of the manifold structure, said water inlet and outlet ports communicating respectively with said header portions.

4. In an induction system for an in-line multi-cylinder internal combustion engine, an intake manifold structure having a pair of longitudinally spaced fuel and air mixture intakes, a carburetor connected with each of said intakes, said intake manifold structure comprising independent separate manifold sections each connected with half of said engine cylinders and each having a distributing portion with one of said intakes, and an outer wall enclosing both said manifold sections and providing a jacket through which heated water may be circulated and having water inlet and outlet ports disposed respectively at the extreme ends of said manifold structure whereby said heated water is circulated longitudinally through the jacket in heat exchange relation with both of said manifold sections, said jacket comprising an open passageway enclosing the bottom walls and both sides of each of said manifold sections, said jacket extending beyond the ends of said manifold sections to provide a header portion at each end of the manifold structure, said water inlet and outlet ports communicating respectively with said header portions, said water inlet and outlet ports aligned substantially co-axially with said manifold structure, whereby the incoming water is introduced to said jacket and divided to flow substantially uniformly in heat exchange relation with the bottom and side walls of said manifold sections.

5. In an induction system for an in-line multi-cylinder internal combustion engine, an intake manifold structure having a pair of longitudinally spaced fuel and air mixture intakes, a carburetor connected with each of said intakes, said intake manifold structure comprising independent separate manifold sections each connected with half of said engine cylinders and each having a distributing portion with one of said intakes, and an outer wall enclosing both said manifold sections and providing a jacket through which heated water may be circulated and having water inlet and outlet ports disposed respectively at the extreme ends of said manifold structure whereby said heated water is circulated longitudinally through the jacket in heat exchange relation with both of said manifold sections, said jacket comprising an open passageway enclosing the bottom walls and both sides of each of said manifold sections, said jacket extending beyond the ends of said manifold sections to provide a header portion at each end of the manifold structure, said water inlet and outlet ports communicating respectively with said header portions, said outer wall comprising substantially straight plane top, bottom and side walls to provide a jacket enclosing both said manifold sections of non-restricting passageways.

6. In an induction system for an in-line multi-cylinder internal combustion engine, an intake manifold structure comprising a pair of independent separate distributing manifold sections each having a primary conducting portion and a plurality of outlets connected with cylinder intake port means, a carburetor connected with each of said primary conducting portions, and a pressure balancing tube connecting said manifold sections, said primary conducting portion of each manifold section opening into one wall thereof, and said balancing tube connecting with each of said manifold sections in the wall lying opposite to the wall into which said primary conducting portion opens and in substantially axial alignment with said primary conducting portions.

7. In an induction system for an in-line multi-cylinder internal combustion engine, an intake manifold structure comprising a pair of independent separate distributing manifold sections each having a downwardly extending primary conducting portion and a plurality of laterally extending port runners connected with cylinder intake port means, an updraft carburetor connected with each of said primary conducting portions, and a pressure balancing tube connecting said manifold sections and generally overlying said intake manifold structure, said primary conducting portion of each manifold section opening into the bottom wall thereof, and said balancing tube connected with each of said manifold sections in the top wall thereof and in substantially axial alignment with said primary conducting portions, said balancing tube comprising a longitudinally extending tube having right angle downturned bends at each end respectively connected with an opening into said manifold sections substantially centrally thereof.

8. In an induction system for an in-line multicylinder internal combustion engine, an intake manifold therefor, comprising an elongated box-like casting having a pair of longitudinally spaced manifold sections integrally cast therewith and each having bottom and side walls spaced from the bottom and side walls of said box-like casting to provide an unrestricted jacket encompassing both said manifold sections and a header portion at each end thereof defined by the end walls of the box-like casting and the adjacent end wall of the manifold section, said casing provided with longitudinally spaced primary fuel and air mixure conducting passage portions each opening into a bottom wall of the manifold section and each connected with a source of fuel and air mixture supply, said jacket having engine coolant inlet and outlet ports at each end respectively communicating with said headers, means for circulating heated coolant longitudinally through said jacket in heat exchange relation with both said manifold sections, and a balance tube connecting said manifold sections and comprising a tube having ends respectively opening downwardly into the top wall of both said manifold sections and in axial alignment with the primary conducting portions.

9. In an induction system for an in-line multi-cylinder internal combustion engine, an intake manifold structure having a pair of longitudinally spaced fuel and air mixture intakes, a carburetor connected with each of said intakes, said intake manifold structure comprising separate longitudinally spaced manifold sections integrally formed within said intake manifold structure and each having a distributing portion and a primary conducting portion connecting said distributing portion with one of said intakes, and an outer wall enclosing both said manifold sections and spaced therefrom for the most part to provide a continuous jacket through which heated water may be circulated and having water inlet and outlet ports disposed respectively at the extreme ends of said manifold structure whereby said heated water is circulated longitudinally through the continuous jacket in heat exchange relation with both of said manifold sections, said outer wall portion lying intermediate said manifold sections having an indented part to provide a predetermined venturi like restriction to the flow of heated water from the jacket about one manifold section to the jacket about said other manifold section.

References Cited in the file of this patent

UNITED STATES PATENTS

| | | |
|---|---|---|
| 1,335,990 | Short | Apr. 6, 1920 |
| 1,929,637 | Hall | Oct. 10, 1933 |
| 2,001,670 | Smith | May 14, 1935 |
| 2,315,215 | Maybeach | Mar. 30, 1943 |
| 2,716,399 | Rothwell | Aug. 30, 1955 |